United States Patent [19]

Hashimoto

[11] Patent Number: 4,794,637

[45] Date of Patent: Dec. 27, 1988

[54] APPARATUS FOR CONNECTING TELEPHONE ANSWERING DEVICE AND TELEPHONE TERMINAL EQUIPMENT, SELECTIVELY, TO TELEPHONE LINES

[75] Inventor: Kazuo Hashimoto, Tokyo, Japan

[73] Assignee: Hashimoto Corporation, Tokyo, Japan

[21] Appl. No.: 932,600

[22] Filed: Nov. 20, 1986

[30] Foreign Application Priority Data

Nov. 22, 1985 [JP] Japan .................... 60-263224
Sep. 8, 1986 [JP] Japan .................... 61-211265

[51] Int. Cl.⁴ .......................................... H04M 1/65
[52] U.S. Cl. .................................. 379/67; 379/100
[58] Field of Search .............. 379/67, 68, 70, 100, 379/96–98, 102

[56] References Cited

U.S. PATENT DOCUMENTS

4,071,698 1/1978 Barger, Jr. et al. ............. 379/84

Primary Examiner—Raymond F. Cardillo
Assistant Examiner—James E. Tomassini
Attorney, Agent, or Firm—Lowe, Price, LeBlanc, Becker & Shur

[57] ABSTRACT

A control system for use with telephone terminal equipment comprises a timer which generates a dummy control signal upon elapse of a preset period of time from the instant of time when operation of an automatic telephone answering apparatus starts. A dummy ringing signal generated in response to the dummy control signal is applied to the telephone terminal equipment connected through a relay to the public telephone circuit. Then, the terminal equipment responds to the dummy ringing signal to operate to be connected with the calling party side.

12 Claims, 6 Drawing Sheets

APPARATUS FOR CONNECTING TELEPHONE ANSWERING DEVICE AND TELEPHONE TERMINAL EQUIPMENT, SELECTIVELY, TO TELEPHONE LINES

BACKGROUND OF THE INVENTION

The present invention relates to an control system which enables a calling party to access through a public telephone circuit a telephone terminal equipment such as a facsimile system to which the control system is added, by the use of various types of telephone set.

Conventionally, control apparatuses for remote control of a telephone terminal equipment such as a facsimile system through the public telephone circuit have been known. For instance, in Japanese Patent Application No. 58-161705 corresponding to Japanese Provisional Patent Publication No. 60-53371 (hereinafter, referred to as the prior art system), there is disclosed an control system, which automatically responds to an incoming call to send an outgoing message, and thereafter, in response to a key signal sent from the calling party, transmits an OK signal representative of permission for information reception (a CNG signal, for instance) to a calling party, and at the same time starts a called party's facsimile system.

Figure 1:
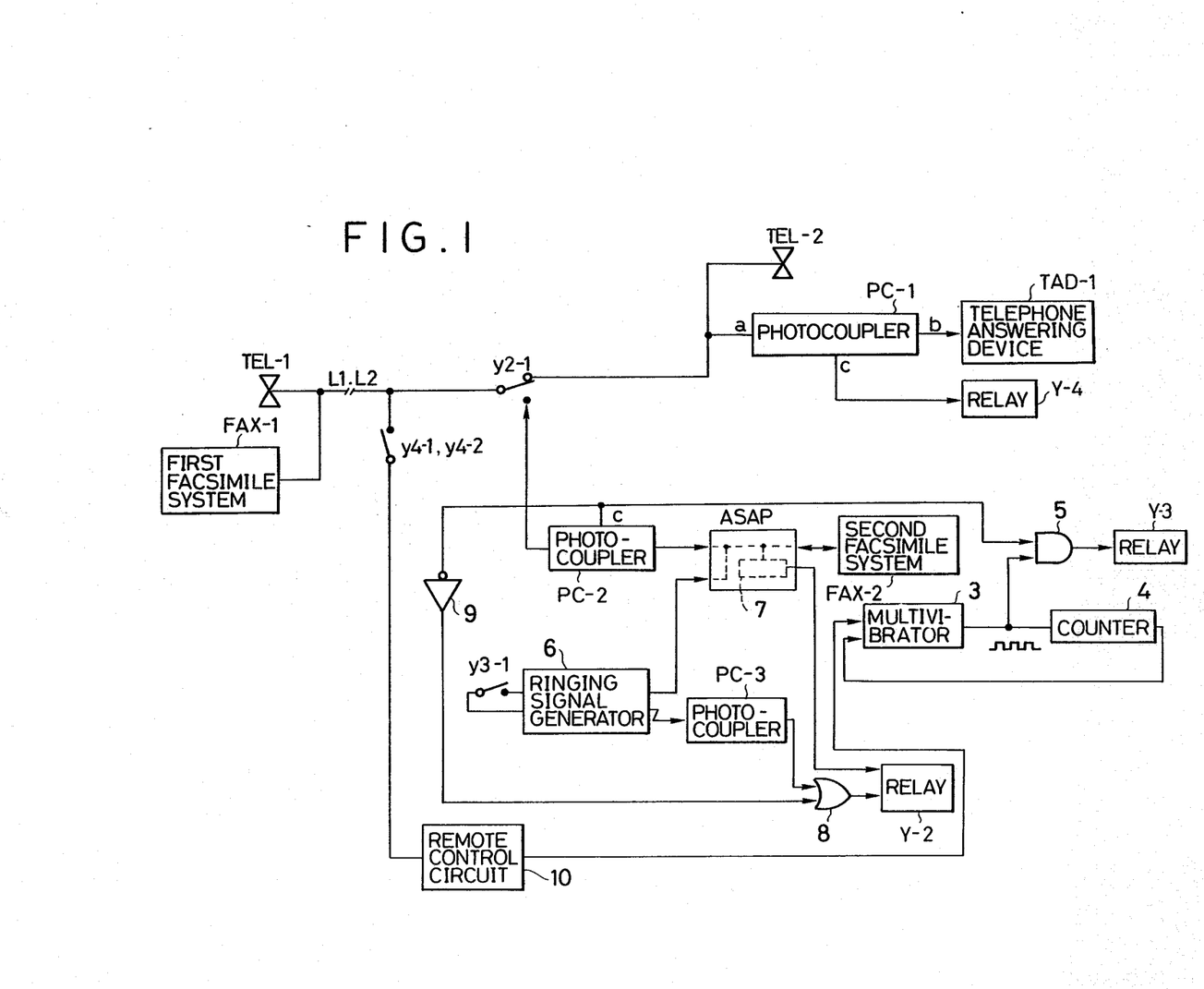
FIG. 1 is a block diagram exemplarily showing a conventional control system.

FIG. 1 shows the above-mentioned prior art system, in which reference symbols TEL-1 and FAX-1 designate a telephone set of a pushphone type and a fascimile system installed at the side of a calling party, respectively, both of which are connected to one side of a public telephone circuit, i.e., telephone lines L1, L2, the facsimile system (hereinafter referred to as a first facsimile system) FAX-1 serving as a telephone terminal equipment. Connected to another side of the telephone lines L1, L2 through a contact y2-1 of a relay Y-2 are a telephone set TEL-2 and an automatic telephone answering device TAD-1 installed at the side of a called party, respectively. Interposedly disposed between the telephone answering device TAD-1 and the relay contact y2-1 is a photocoupler PC-1 adapted to be turned on by an electric loop current which flows when the telephone answering device TAD-1 responds to an incoming call supplied through the telephone lines L1, L2 and a capacitor (not shown) connected in parallel with the photocoupler PC-1, and then a loop circuit incorporated in the device TAD-1 engages the device with these telephone lines. Further, a relay Y-4 is connected to an output terminal C of the photocoupler PC-1. A multivibrator 3 which is connected to the output side of a remote control circuit 10 mentioned below is followed by a counter 4 which is arranged to generate an output when counting up three pulse outputs supplied from the multivibrator 3, the same multivibrator being arranged to be disabled when supplied at its another input terminal with this output of the counter 4. Further, a relay Y-3 is connected to the multivibrator 3 through an AND gate 5.

Reference numeral 6 denotes a ringing signal generator which cooperates with ON/OFF action of a contact y3-1 of the relay Y-3 effected as mentioned below, to supply a dummy signal to a transfer device ASAP, which signal is the same as or similar to the telephone ringing signal supplied through the telephone lines L1, L2. Since the transfer device ASAP is composed of a known device of the type adapted to call out a preset destination for transfer, a detailed explanation thereof is omitted. This transfer device ASAP is connected, on one hand, to the telephone lines L1, L2 through the relay contact y2-1 and the photocoupler PC-2, and on the other hand, to a facsimile system (hereinafter referred to as a second facsimile system) FAX-2 as a telephone terminal equipment installed at the side of the called party. Further, the output terminal C of the photocoupler PC-2 is connected through an invertor 9 to an input terminal of an OR gate 8, which has another input terminal connected to the ringing signal generator 6 through the photocoupler PC-3 and an output terminal connected to the relay Y-2, the above-mentioned elements PC-2, PC-3, OR gate 8 and invertor 9 forming a relay control means for controlling ON/OFF operation of the relay Y-2, the same relay being connected to an output terminal of a second timer 7 incorporated in the transfer device ASAP.

Reference numeral 10 denotes a remote control circuit having an input side connected to the telephone lines L1, L2 through contacts y4-1, y4-2 of the relay Y-4 and an output side connected to one of input terminals of the said multivibrator 3.

Normally, the transfer device ASAP is omitted in the prior art system, and thus the photocoupler PC-2 is directly connected to the second facsimile system FAX-2.

Next, operation of the prior art system of FIG. 1 will be briefly explained.

When an incoming call from the caller's telephone set or pushphone TEL-1 is received by the called party's telephone set TEL-2, ringing signals are supplied to the telephone answering device TAD-1 through a capacitor, not shown, connected in parallel with the photocoupler PC-1, to make the device TAD-1 start, to thereby turn the photocoupler PC-1 on so as to connect the device TAD-1 to the telephone lines L1, L2 through the photocoupler PC-1. Thereafter, the outgoing message is transmitted from the device TAD-1. If a remote control button of the telephone set TEL-1, the [#] button, for instance, is depressed by the caller during the transmission of outgoing message or after completion of recording an incoming message from the caller, which recording is effected by the telephone answering device TAD-1 operated in its recording mode into which the apparatus is switched subsequent to the outgoing message transmission, a remote control signal corresponding to the depressed button is transmitted to, through the relay contacts y4-1, y4-2, and detected by the remote control circuit 10. At that time, the multivibrator 3 is triggered by an output from the circuit 10 so as to cooperate with the counter 4 to intermittently actuate the relay Y-3 several times through the AND gate 5 which is in an enabled condition. As a result, the contact y3-1 of the relay Y-3 operates to drive the ringing signal generator 6 which applies the dummy signals to the second facsimile system FAX-2 through the transfer device ASAP to start the same system FAX-2. During the time the dummy signals are generated, the relay Y-2 is supplied with an electric current through the photocoupler PC-3 and the OR gate 8, and thus remains energized. Further, the relay Y-2 is maintained in its ON state by an output which is inversion of a L level output from the phontocoupler PC-2 which is rendered ON with start of the second facsimile system, and thus the second facsimile is connected to the telephone lines L1, L2 through the relay contact y2-1, the photocoupler PC-2 and the transfer device ASAP, so that data is transmitted between the first and second facsimile systems, if the caller depresses a communication button or start button (not shown) of the first facsimile.

However, prior art arrangements of this kind are useable for use only with the caller's telephone set of a key telephone or pushphone type which is capable of generating the remote control signal or tone, and thus these apparatuses have been strictly limited in their use. Further, in spite that, in the prior arrangements, when the user effects remote control listening to drive the telephone answering device in its playback mode so as to listen to an incoming message recorded by the device, a remote control signal having been recorded together with the caller's message is reproduced to be supplied to the remote control circuit 10 so that the second facsimile system can erroneously operate, conventional arrangements are provided with no effective countermeasure for prohibiting such malfunction of the second facsimile system. Further, the conventional arrangements have not been so designed as to effect switching between reception/transmission modes of the second facsimile in a simplified manner.

SUMMARY OF THE INVENTION

An object of the present invention is to provide a control system for use with a telephone terminal equipment, which system automatically connects the telephone terminal equipment to a calling party upon elapse of a preset period of time after start of an automatic telephone answering device in response to an incoming call, without supply of a signal such as a talking signal from the calling party.

Another object of the present invention is to provide a control system for use with a telephone terminal equipment, which is capable of eliminating restrictions in individually using an automatic telephone answering device and a called party's telephone set, and of eliminating disturbance which could otherwise occur during conversation between a caller and the called party through either the telephone set or the telephone answering device.

A further object of the present invention is to provide a control system for use with a telephone terminal equipment such as a facsimile system, which is capable of connecting the terminal equipment to a public telephone circuit, during conversation, by means of a remote control operation where a predetermined remote control signal is transmitted from a calling party.

A still further object of the present invention is to provide a control system for use with a telephone terminal equipment, which is arranged to disable the above remote control function when a different remote control signal is supplied.

A further object of the present invention is to provide a control system for use with a telephone terminal equipment such as a facsimile system and with a telephone answering device, which is capable of disabling operation of the terminal equipment when a telephone set is off-hook during operation of the control system.

According to the present invention, there is provided a control system for selectively connecting and disconnecting an automatic telephone answering device responsive to a telephone ringing signal and a telephone terminal equipment such as a facsimile system to and from a public telephone circuit.

The control system comprises timer means for generating an output signal upon elapse of a preset period of time from the instant operation of the telephone answering device starts and remote control signal reception means responsive to the output from the timer means to generate an output. A dummy ringing signal, which is substantially the same as the telephone ringing signal, is generated by ringing signal generating means responsive to the output from the remote control signal reception means, and the automatic telephone answering device and the telephone terminal equipment are disconnected from and connected to the public telephone circuit, respectively, by relay means responsive to operation of the remote control signal reception means. Further, the control system includes relay control means which is connected to the relay means and the telephone terminal equipment, and causes the relay means to maintain the connection between the terminal equipment and the telephone circuit when the terminal equipment is operated, and restores the relay means so that connection is established between the telephone answering device and the telephone circuit upon completion of operation of the telephone terminal equipment.

The present invention is advantageous in providing various practical functions which have not been achieved by prior art systems such as improved accessibility to a telephone terminal equipment in using the telephone set of ordinary dial type other than pushphone, and improved matchability to high-speed facsimile systems and to fully automated facsimile systems with automatic dialing function.

The above and other objects, features and advantages of the present invention will become apparent from the following description when taken in conjunction with the accompanying drawings in which preferred embodiments of the present invention are shown by way of illustrative example.

DETAILED DESCRIPTION

With reference to the accompanying drawings, preferred embodiments of the present invention will be now explained.

Figure 2:
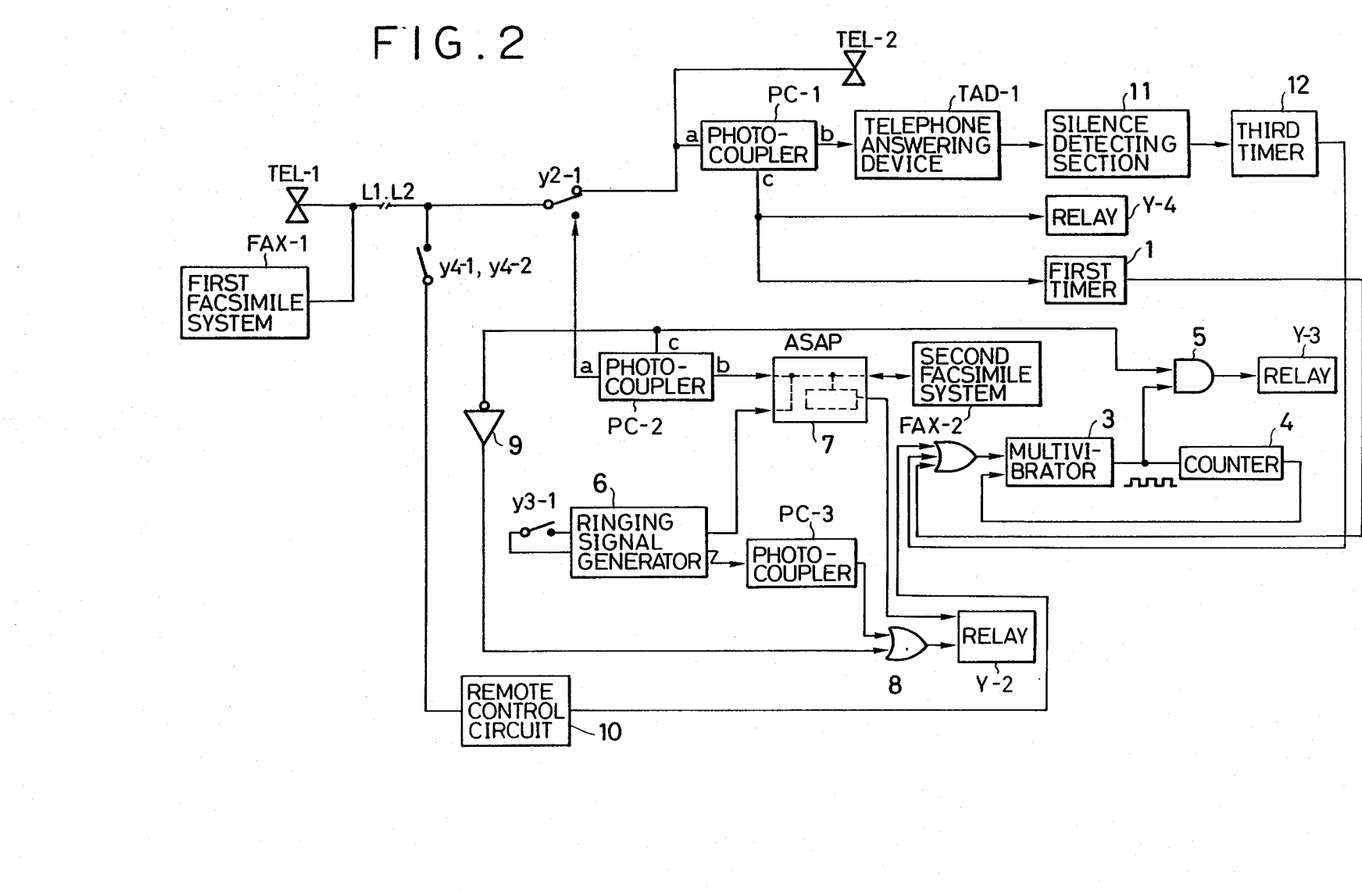
FIG. 2 is a block diagram showing a control system according to a first embodiment of the present invention.

FIG. 2 shows a control system of a first embodiment of the present invention, in which parts corresponding to those of FIG. 1 are shown by like numerals or symbols and detailed explanations thereof will be omitted. The control system comprises a first timer 1 which is connected to the output terminal C of the photocoupler PC-1 in parallel with the relay Y-4, and is arranged to generate a H level signal as a dummy remote control signal when a predetermined period of time, e.g., 30 seconds, has elapsed from the instant the photocoupler PC-1 is activated, the H level signal being supplied to the multivibrator 3 through the OR gate 2.

Reference numeral 11 denotes a silence detecting section of detecting whether a silent condition where no voice is transmitted from the caller is present or not, and for generating an output indicative of the detected result. The silence detecting section 11 consists of a known circuitry which is arranged to recognize the silent condition upon supply of any signals other than signals having a randam waveform such as voice or talking signals, an input side of the section 11 being connected to a voice input section (not shown) of TAD-1. Disposed following the silence detecting section 11 is a third timer 12 which is arranged to generate a H level output when it is continuously supplied with the output of the section 11 indicative of the silent condition for 5 seconds, the H level output from the timer 12 being supplied to the multivibrator 3 throutgh the OR gate 2. Any types of commercially available telephone answering device may be employed as the telephone answering device TAD-1. However, it is more preferable to use a particular answering device of the type disclosed in Japanese Patent Application No. 58-145747 (Japanese Provisional Patent Publication No. 60-38959) filed by the assignee of the present application, in which a silent section is formed beforehand between first and second ougoing message, and a switching means is operable to be switched between a state for transmission of the second outgoing message and another state for operation of an auxiliary equipment added to the answering device. As mentioned below, the apparatus of this kind make it possible to access to the auxiliary system such as facsimile system with a shortened access time.

Figure 3:
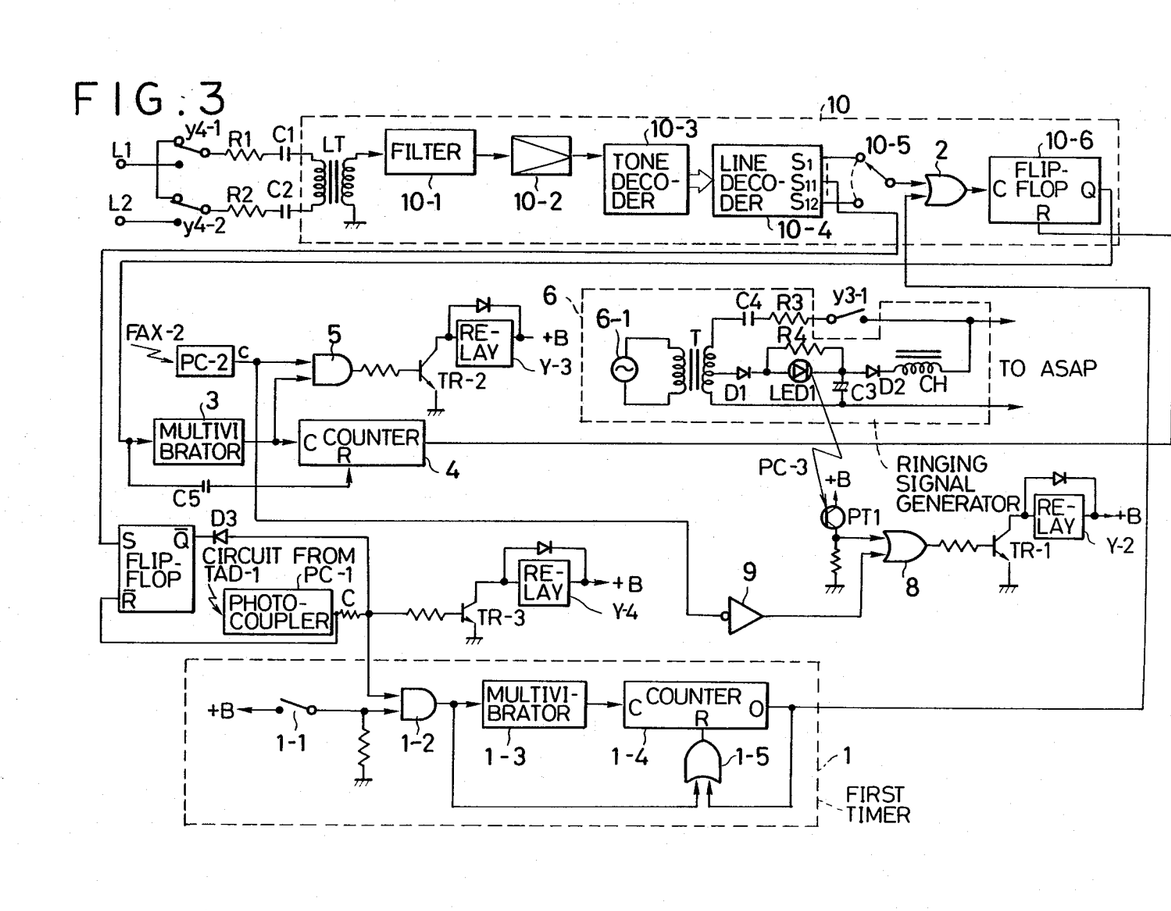
FIG. 3 is an electric circuit diagram showing in detail an essential part of FIG. 2.

FIG. 3 shows in detail an essential part of the circuit of FIG. 2, in which the first timer 1 comprises a manual timer switch 1-1 for connection to an external power source +B, the switch 1-1 being connected to a multivibrator 1-3 and an input terminal of an OR gate 1-5 through an AND gate 1-2 having an input terminal connected to the photocoupler PC-1. Connected at an input terminal C to the output terminal of the multivibrator 1-3 is a counter 1-4 having an output terminal O connected to the OR gates 2, 1-5 and a reset input terminal R connected to the output terminal of the OR gate 1-5. Therefore, the timer 1 is so arranged that the multivibrator 1-3 is triggered while the photocoupler PC-1 is in its ON state with the switch 1-1 closed, and the counter 1-4, which is reset at the instant the photo-coupler PC-1 is turned on, supplies a timer signal to the OR gate 2 and is reset when counting up a certain number of pulses supplied from the multivibrator 1-3, which number corresponds to a preset timer period, e.g., 30 seconds.

The ringing signal generator 6 is arranged to step up an output of 16 Hz to 25 Hz supplied from a signal source 6-1 to tens of volts by means of a transformer T to obtain an alternating current component of the above-mentioned dummy ringing signal, and obtain a direct current component thereof by rectifying and smoothing an alternating current signal taken out from an intermediate tap of the secondary winding of the transformer T by means of a diode D1 and a capacitor C3, and further superimpose the direct current component on the alternating current component which is outputted through a capacitor C4, a resistor R3, and the relay contact y3-1 of the relay Y-3 intermittently closing by the multivibrator 3 as mentioned below, the resultant dummy ringing signal being outputted to the transfer device ASAP. A light emitting diode LED-1 is arranged to be tuned on by the direct current component of the dummy signal, and cooperates with a phototransistor PT-1 to form the photocoupler PC-3.

The remote control circuit 10 comprises a line transformer LT connected through the relay contacts y4-1, y4-2 to the telephone lines L1, L2, a band pass filter 10-1, an amplifier 10-2, and a tone decoder 10-3, so as to decode a tone supplied through the telephone lines L1, L2 and corresponding to the type of a depressed button among the [0]-[9], [*], [#] buttons of the calling party's pushphone TEL-1, as mentioned in detail later, the resultant output signal from the decoder 10-3 consisting of plural bits each of which have a specific level coresponding to the result of decoding. Further, the circuit 10 comprises a line decoder 10-4 for decoding the output signal of the tone decoder 10-3 to produce a H level signal at a corresponding one of output terminals S1 through S12. Furthermore, the circuit 10 comprises an alteration switch 10-5 for selecting a type of tone as a remote control signal for start of the second facsimile system FAX-2, and a flip-flop 10-6 having a set input terminal C connected to the switch 10-5 through the OR gate 2, and a set output terminal Q connected to the input terminal of the multivibrator 3 and to a reset input terminal R of the counter 4, so as to trigger the multivibrator 3 by the Q output of the flip-flop 10-6 upon reception of a predetermined type of tone.

The automatic telephone answering device TAD-1 has a known remote control function for listening to an incoming message recorded on an incoming message tape (not shown) mounted therein from a remote place through the telephone lines L1, L2. In order to ensure this remote control function, a flip-flop 11 is connected to a particular output terminal of the line decoder 10-4 of the remote control circuit 10. More specifically, the flip-flop 11 is connected at its set input terminal S to the output terminal S11 of the decoder 10-4 at which a H level output signal appears upon depression of the [*] button for disconnection of the remote control circuit 10 from the telephone lines L1, L2 before the message listening operation is effected. Further, the flip-flop 11 has a reset input terminal $\bar{R}$ connected to the output terminal $\bar{C}$ of the photocoupler PC-1 and an output terminal $\bar{Q}$ connected to the same output terminal C of the coupler through a diode D3 interposed therebetween with the polarity shown in FIG. 3, so that the output from the photocoupler PC-1 for energization of the relay Y-4 is sucked into the $\bar{Q}$ output terminal of the flip-flop 11 to deenergize the relay Y-4 upon reception of the tone corresponding to depression of the [*] button. Reference symbols TR-1 to TR-3 in FIG. 3 denote driving transistors for the relays Y-1 to Y-3, respectively.

In the following, operation of the control system as constructed above will be explained.

First, when the calling party calls out the called party's telephone set TEL-2 by the use of the telephone set TEL-1, the telephone set TEL-2 rings and at the same time a telephone ringing signal is supplied to the automatic telephone answering device TAD-1 through a capacitor (not shown) connected in parallel with the photocoupler PC-1 to start the same device TAD-1. As a result, a loop circuit, not shown, incorporated in the device TAD-1 operates to engage the telephone lines L1, L2, with the photocoupler PC-1 turned on by an electric loop current flowing through the input and output terminals a and b of the photocoupler PC-1 upon engagement of the telephone lines.

When the automatic telephone answering device TAD-1 start in the above manner, an outgoing message prerecorded on an outgoing message tape, not shown, is transmitted to the calling party through the telephone lines L1, L2. For instance, the outgoing message contains a message "This is Hashimoto Corporation. May we have your name?", which is followed by a silent section for 5 seconds, and a further message "If you wish to leave a message, please begin your message after the beep." If you wish to use our facsimile, please depress the [#] button. Also, "you will be able to use our facsimile if you continue to speak for 10 seconds or more."

Therefore, if the calling party wishes to access the facsimile system FAX-2 and the calling party's telephone set TEL-1 is of pushphone type, he is only required to depress the [*] button, and the operation of the control system on that occasion will be explained hereinbelow.

The control system of the present invention is so arranged as to allow access to the facsimile system even if the telephone set TEL-1 is of the type other than pushphone. That is, when the automatic telephone answering device TAD-1 is started in response to an incoming call, the photocoupler PC-1 is switched to its ON state, as mentioned above, with its output terminal C set at H level. Due to this H level output signal from the photocoupler PC-1, the first timer 1 is caused to start, and thereafter a timer output or a dummy remote control signal from the first timer 1 is applied to the OR gate 2 upon elapse of a preset timer period, e.g., 30 seconds which is the sum of 20 seconds for which the outgoing message is transmitted and 10 seconds for which the incoming message is recorded, in other words, while the calling party is recording his message in the automatic telephone answering device TAD-1 or after completion of such recording. As a result, the multivibrator 3 is triggered by a H level signal appearing at the set output terminal Q of the flip-flop 10-6 (FIG. 3) of the remote control circuit 10, to intermittently generate pulse outputs three times, each pulse lasting for 1 second with time intervals of 2 seconds. When counting up the three pulse outputs of the multivibrator 3, the counter 4 generates an output to reset the flip-flop 10-6 so as to render the multivibrator 3 disabled.

The three pulse outputs from the multivibrator 3 are applied to the relay Y-3 through the AND gate 5 which is enabled by the H level signal supplied from the output terminal C of the photocoupler PC-2, so that the contact y3-1 of the relay Y-3 is intermittently open and closed. As a result, the dummy ringing signals of 16 to 25 Hz each lasting 1 second are applied from the ringing signal generator 6 through the transfer device ASAP to the second facsimile system FAX-2 three times, with time intervals of 2 seconds. Further, the photocoupler PC-3 is turned on by the direct current component of the dummy ringing signal, and then the relay Y-2 is energized by an output supplied from the collector of the transistor TR-1 in response to the conduction of the photocoupler PC-3. In this manner, the relay Y-2 is energized by the direct current component when the second facsimile system FAX-2 is started, so that the switching to the second facsimile FAX-2 is ensured.

Upon start of the second facsimile system FAX-2, the loop circuit incorporated therein performs its engaging operation to cause an electric loop current to flow, which in tuns, to cause the photocoupler PC-2 to be turned on. Further, a L level signal outputted from the output terminal C of the photocoupler PC-2 is inverted by the invertor 9 and then applied to the relay Y-2 through the OR gate 8 to keep the same relay energized. As a result, the second facsimile system FAX-2 is connected to the telephone lines L1, L2 through the relay contact y2-1 which is now switched to its transfer device side position, with the automatic telephone answering device TAD-1 restored.

Next, the second facsimile system FAX-2 transmits a predetermined tone to the calling party's telephone set TEL-1. After confirming this tone, the calling party operates the first facsimile system FAX-1 to start. Thereafter, telecommunication is effected between the first and second facsimile systems which will be automatically restored upon completion of data transmission from the first facsimile. When the second facsimile system FAX-2 is restored, the photocoupler PC-2 is turned off, and the transfer device ASAP detects this to cause the second timer 7 incorporated therein to start, with the relay contact y2-1 switched to the position shown in FIG. 2. Thereafter, the second timer 7 generates an output after elapse of 2-3 seconds to energize the relay Y-2, so as to switch the relay contact y2-1 to its transfer device side position again. At the same time, the telephone lines L1, L2 are engaged by the engaging function of the transfer device ASAP, to thereby turn the photocoupler PC-2 on and keep the relay Y-2 in its ON state.

Then, the transfer device ASAP operates to detect a dial tone. Upon detection of the dial tone, the device ASAP calls out a preset destination for paging which has been beforehand set through a keyboard, not shown, of the transfer device ASAP, and transmits a specific tone to notify reception of an incoming call by the system FAX-2 when a called party responds to the call from the transfer device. As mentioned above, the control system permits a caller to access the telephone terminal device even when the caller's telephone is of the type other than pushphone and no remote control signal for starting the telephone terminal device such as the second facsimile system FAX-2 is sent from the caller.

In the following, the operation of the control system will be explained in the event that the automatic telephone answering device TAD-1 starts in response to an incoming call and then a particular remote control signal is sent from the caller by depressing a particular button of the telephone set TEL-1 of pushphone type so as to start the second facsimile system FAX-2 during operation of the telephone answering device TDA-1.

First, the photocoupler PC-1 is turned on upon reception of an incoming call as mentioned above, and the transistor TR-3 (FIG. 3) is turned on by a H level signal supplied from the output terminal C of the coupler PC-1 to energize the relay Y-4, with the contacts y4-1, y4-2 closed. As a result, the remote control circuit 10 is connected to the telephone lines L1, L2 through these contacts to be ready for reception of a remote control signal. When a particular remote control signal sent from the caller is applied to the remote control circuit 10 having a decoding function achieved by the tone decoder 10-3, the line decoder 10-4 and the alteration switch 10-5, the same circuit 10 detects this to output a H level signal from its flip-flop 10-6 to the multivibrator 3. Thereafter, operations are performed, which operations are the same as in the abovementioned case wherein the multivibrator 3 is triggered by an output from the first timer 1, and thus an explanation of such subsequent operations will be omitted. However, normally, no incoming message is recorded and no paging operation by the transfer device ASAP is effected because, normally, the remote control signal has been sent during the answering operation of the automatic telephone answering device TAD-1, and such paging operation is not required.

On the other hand, in case that the telephone set TEL-2 is off-hook for conversation by the called party at his office during the operation of the answering device TAD-1, unlike the above-mentioned case, both the loop circuits of the telephone answering device TAD-1 and the telephone set TEL-2 operate to form dual loops which further decrease the line voltage. As a result, the photocoupler PC-1, which is inserted in series in the line of the telephone answering device TAD-1 and in a conductive state, is now turned off to extinguish the output at its output terminal C, so as to deenergize the first timer 1. That is, a L level signal appears at the corresponding input terminal of the AND gate 1-2 (FIG. 3) of the timer 1, and thus the output from the AND gate is switched from H level to L level, to deenergize the multivibrator 1-3, and at the same time reset the counter 1-4 through the OR gate 1-5. As a result, the output from the first timer 1 is extinguished to prevent the second facsimile system FAX-2 from starting, so that conversation between the both parties is not disturbed.

Next, an explanation will be given as to the operation of the control system for remote listening, through the telephone lines L1, L2, of an incoming message received by the telephone answering device TAD-1.

In connection with such remote listening, the following problem can occur. The control system of the present invention is so arranged to receive the remote control signal, e.g., the [#] tone for starting the second facsimile system FAX-2 during the operation of the telephone answering device TAD-1, as mentioned above. Accordingly, in the event that the [#] tone is received while voice from the caller (an incoming message) is recorded on the incoming message tape of the telephone answering device TAD-1, the [#] tone is also inevitablly recorded on the incoming message tape. As a result, it the relay contacts y4-1, y4-2 are rendered closed during the remote listening operation effected in response to supply of a particular tone (mentioned later) from the caller, the thus recorded [#] tone is also supplied to the remote control circuit 10 through the relay contacts y4-1, y4-2. The thus supplied tone functions in the same manner as the [#] tone for start of the facsimile FAX-2 intentionally sent from the caller, to cause the second facsimile system FAX-2 to start and the telephone answering device TAD-1 to be disconnected from the telephone lines L1, L2, so as to prevent the remote listening operation.

To eliminate this problem, the control system of the invention is so operable as to cause the relay contacts y4-1, y4-2 open upon remote listening. That is, when the owner of the control system depresses the [*]button of a pushphone to send a particular remote control signal, e.g., the [*] tone other than the [#] tone for start of the second facsimile FAX-2, the thus sent [*] tone is decoded by the tone decoder 10-3 of the remote control circuit 10, and a H level signal is outputted from the output terminal S11 of the line decoder 10-4 to set the flip-flop 11. As a result, the output $\bar{Q}$ of the flip-flop 11 is switched from H level to L level to decrease to L level the potential at the base of the transistor TR-3 through the diode D3, to turn off the same transistor, which in turn to render the relay Y-4 restored. Thus, the relay contacts y4-1, y4-2 are restored to the positions shown in FIG. 2 so that the remote control circuit 10 is disconnected from the telephone lines L1, L2. Therefore, even when the [#] tone contained in the recorded incoming message is reproduced during the remote listening, start of the second facsimile system FAX-2 and disconnection of the telephone answering device TAD-1 are positively prevented.

Further, upon depression of the [*] button, a L level signal appears at one input terminal of the AND gate 1-2 connected to the reset output terminal 0 of the flip-flop 11, and thus the timer 1 is caused to be disabled.

In this manner, the remote control circuit 10 is disconnected from the telephone lines L1, L2 by sending the [*] tone. Accordingly, required operations for remote listening are positively performed in a known manner if a particular tone is transmitted to the telephone answering device TAD-1 by depressing a particular button for remote listening to either the pushphone or a remote control signal transmitter, not shown, which is adapted to be connected to a transmitter section (not shown) of the caller's telephone set TEL-1 for transmitting a tone corresponding to the depressed button thereof in the same manner as the pushphone. Or the particular tone is transmitted from the inside of the facsimile. When the remote listening is completed and then the telephone answering device TAD-1 is restored, the output from the output terminal C of the photocoupler PC-1 is switched from H level to L level to reset the flip-flop 11 to ready the device for a subsequent incoming call.

Incidentally, the above-mentioned [*] tone may be transmitted at any time prior to reproduction of the [#] tone recorded on the incoming message tape, e.g., after rendering a remote control section (not shown) of the telephone answering device TAD-1 open by operation the remote control transmitter.

To be noted, since the timer 1 is disabled upon generation of the [*] tone as mentioned above, switching operation from the state by the timer operation where the incoming message is recordable to the state where the second facsimile is operated, is rendered disabled by the transmission of the [*] tone, thereby permitting the caller to leave his or her message over an arbitrary period of time, this function of the [*] tone being practically highly usefull. Incidentally, the [*] tone is transmittable even by means of the above-mentioned remote control transmitter connected to the caller's telephone set of the type other than the pushphone.

In some cases, the caller only wishes to send data information immediately through his own facsimile system to the called party, without the need of recording his message in the telephone answering device at the called party side. To that end, in the present invention, if the caller does not announce his name during the time period corresponding to the silent section of 5 seconds contained in the outgoing message following the above-mentioned first outgoing message "This is Hashimoto Corporation. May we have your name?", the silence detecting section 11 detects absence of announcement, and thereafter, the third timer 12 detects a continuous silent condition for several seconds, a H level signal is outputted from the third timer 12 to one of the input terminals of the OR gate 2, so that the dummy ringing signal is generated to start the second facsimile system. This function is effectively utilized for reduction in an access time required for starting data transmission between the facsimile systems at the both parties. That is, even if a particular signal is supplied from the first facsimile system during the time corresponding to the silent section of several seconds, such particular signal is detected as not being voice because the particular signal is a regular signal different from voice having a random waveform, to permit the second facsimile system to start. A detecting means therefore has been known as a VOX circuit for use in the telephone answering device, which circuit is designed to detect the envelope of a tone which includes voice, and then count up a number of waveforms of the enveloped tone each a predetermined period of time, to determine a tone having a number larger than a predetermined count as being voice.

Next, with refrence to FIG. 4, a second embodiment of the present invention will be explained, which is different from the above-mentioned first embodiment in that it is designed so that switching operation between reception/transmission modes of the second facsimile can be simply effected and the telephone set TEL-2 is connected to special terminals of the second facsimile for connection to the telephone set, such connection between the telephone set TEL-2 and the second facsimile system FAX-2 positively preventing a malfunction of the second facsimile even when the telephone set is off-hook during operation of the facsimile.

Figure 4:
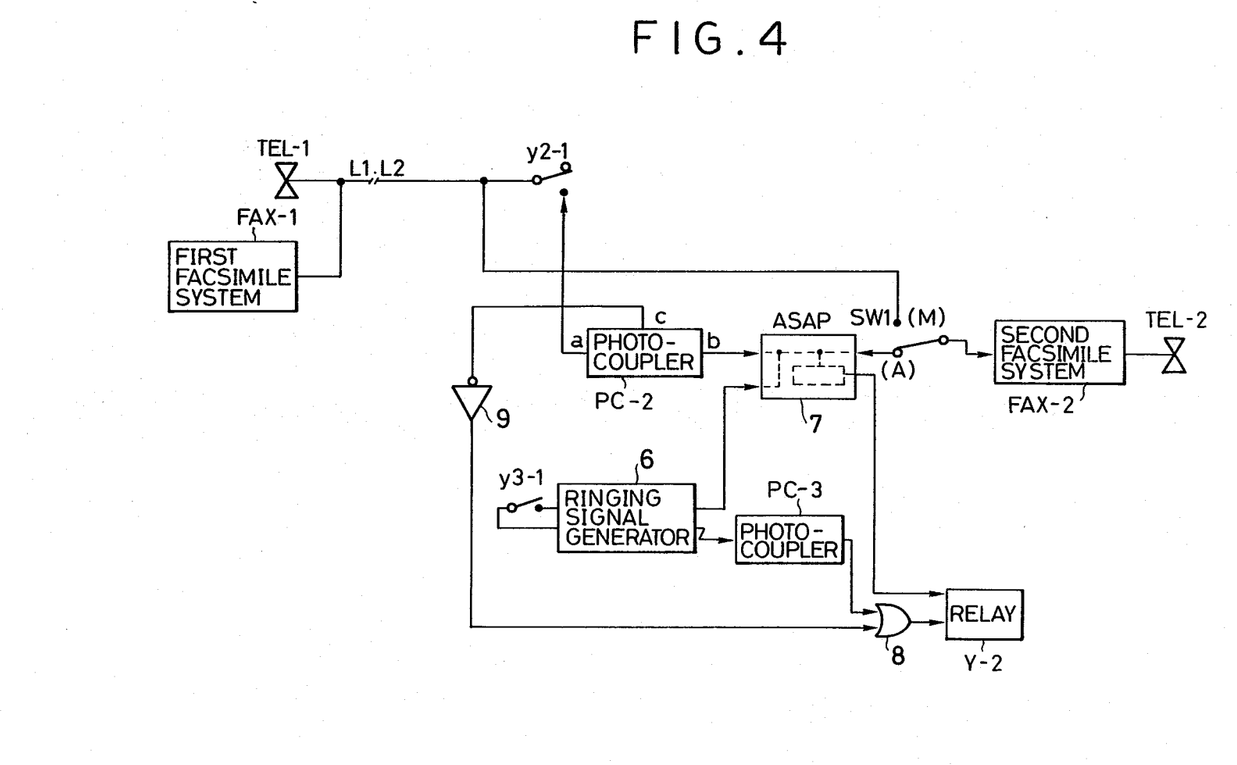
FIG. 4 is a block diagram showing a switching section of a control system according to a second embodiment of the present invention, which section effecting switching between reception/transmission modes of a telephone terminal equipment.

In FIG. 4, a manual switch SW1 is provided, which is arranged to be switched between its reception mode position (A) and its transmission mode position (M). In order to effect data transmission through the second facsimile system FAX-2, the user operates the switch SW1 to switch to the transmission mode position, and then picks up the handset of the telephoe set TEL-2 so that a loop circuit accommodated in the second facsimile operates to connect the telephone set to the telephone lines through the second facsimile and the switch SW1. Thereafter, the user dials to call out the other party, and then depresses the start button (not shown) of the second facsimile after receiving an acknowledgement tone from the other party's facsimile system, so as to send the data. Upon completion of data transmission, the switch SW1 is switched manually to its reception mode position (A) to ready for a next incoming call.

Upon reception of an incoming call, the loop circuit, incorporated in the telephone answering device (not shown) connected to the relay contact y2-1 at the switch position of the same contact illustrated in FIG. 4, operates to turn on the photocoupler PC-1, thereby starting the device TAD-1 and turning the relay Y-4 on. As a result, the remote control circuit 10 is connected to the telephone lines L1, L2 through the relay contacts y4-1 and y4-2. Thereafter, the second facsimile is started in response to the dummy ringing signal generated from the ringing signal generator 6 due to the intermittent on-off operation of the relay Y-3, when the [#] remote control signal is supplied. At the same time, the photocoupler PC-2 is turned on to cause energization of the relay Y-2 so as to switch the relay contact y2-1 to its switch position opposite to that illustrated. The second facsimile is connected to the telephone lines L1, L2 through the switch SW1, the transfer device ASAP and the photocoupler PC-2. Thereafter, data sent from the first facsimile system is received by the second facsimile, as mentioned above.

Figure 5:
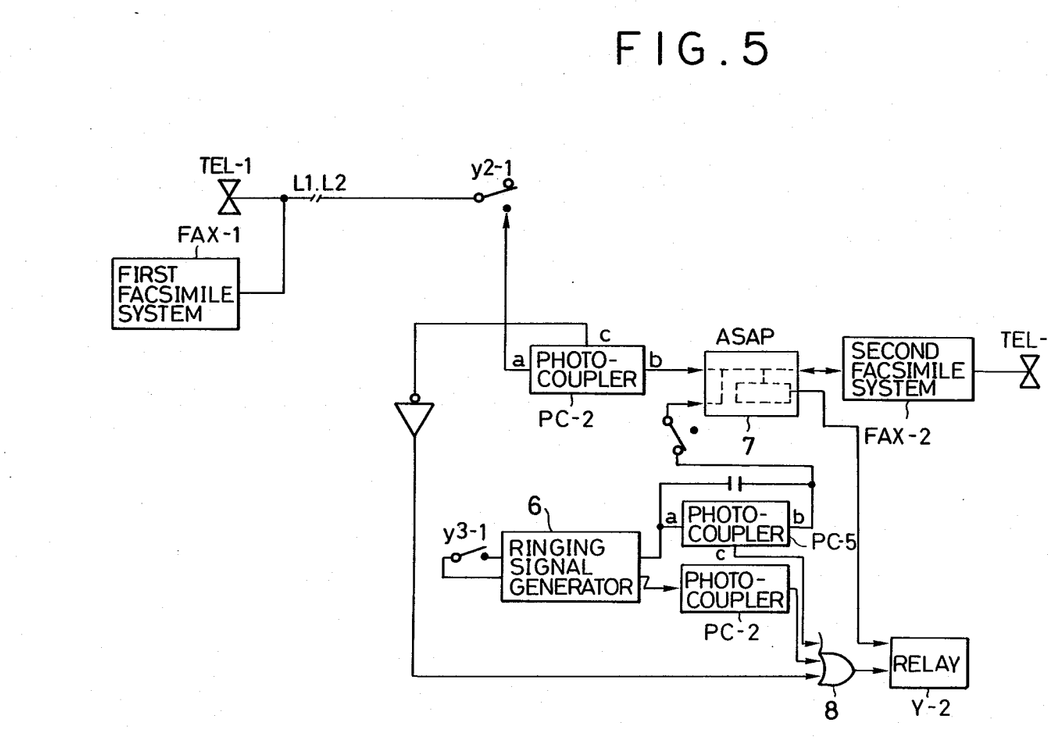
FIG. 5 is a view similar to FIG. 4, which shows part of a control system according to a third embodiment of the present invention.

FIG. 5 shows part of arrangement according to a third embodiment of the present invention. This embodiment differs from the second embodiment in that it eliminates the need of manual operation of the switch SW1 and automatically effects switching operation between the reception/transmission modes. Thus, in the arrangement of FIG. 5, the switch Sw1 of FIG. 4 is eliminated, and, for automatic switching, a photocoupler Pc-5 is added and the OR gate 8 is provided with an additional input terminal.

In operation, when the handset of the telephone set TEL-2 is picked up to effect the data transmission through the second facsimile system, a circuitry path including the second facsimile, the transfer device ASAP, the photocoupler PC-5 and the ringing signal generator 6 is formed, and at the same time, a direct current flows through the photocoupler PC-5 due to the direct current component which is normally generated from the generator 6, so that a H level output appears at the output terminal c of the photocoupler PC-5 to be supplied through the OR gate 8 to the relay y-2 so as to energize the same relay.

As a result, the relay contact y2-1 of the relay Y-2 is switched from the position illustrated in FIG. 5 to the opposite position. This causes flow of an electric current flowing through the loop circuit of the second facsimile system upon off-hook of the telephone set TEL-2 and then flowing into the photocoupler PC-2 through the transfer device ASAP to turn the same photocoupler on, thereby forming a direct current loop passing through the telephone set TEL-2, the second facsimile, the transfer device ASAP, the photocoupler PC-2 and the telephone lines L1, L2. At the same time, a L level output is supplied from the terminal c of the photocoupler PC-2 to the relay Y-2 through the inverter 9 and the OR gate 8 to maintain the same relay energized. That is, the relay Y-2 is held in its ON state by the output from the photocoupler PC-2, although the contact y2-2 opens to block the supply of the output from another photocoupler PC5. Thereafter, as in the same manner as mentioned with reference to FIG. 4, data transmission is effected in response to dialing operation and the depression of the start button of the second facsimile, which is automatically restored upon completion of data transmission to disengage the loop circuit accommodated therein. As is apparent from the foregoing explanation, disengagement of the direct current loop causes extinction of the output from the photocoupler PC-2 to restore the relay Y2.

Operation of the second facsimile in its reception mode is substantially the same as in the second embodiment, and thus an explanation thereof will be omitted.

Incidentally, the alternating current and direct current components supplied from the ringing signal generator 6 for start of the second facsimile are supplied to the same facsimile through a capacitor C10 and the photocoupler PC-5, respectively.

Although the facsimile system is employed as the telephone terminal equipment in the above-mentioned embodiments, various telephone terminal equipments of the type responsive to a telephone incoming call may be employed in place of the facsimile device, a personal computer, etc. In the case of the personal computer, etc., since a setup time of 10 seconds to several tens of seconds is required from the instant power is applied, for a series of setup operations such as driving of floppy disks and of motors for driving these disks or the like, and worming-up of the computer, the caller is required to await for considerable time period until data communication through the computer is permitted, even if the power is applied immediately upon reception of an incoming call. Thus, the caller is discouraged from awaiting completion of setup operations, and thus the telephone connection for data communication is often disconnected by the caller. On the contrary, according to the present invention, the telephone answering device is so designable as to operate in response to the incoming call to transmit the outgoing message, and complete the setup of the computer until the message comes to an end. This makes it easy for the caller to await the completion of setup of the computer, in particular, if the outgoing message contains an explanation as to the setup operations. As a result, data communication is performable without difficulties even when the calling party is absent from his office, etc.

Next, in case that the second telephone answering device (not shown) is employed in addition to the telephone answering device TAD-1, the same device may be arranged to respond to an incoming call from unspecified persons, while the second telephone answering device may be arranged to record messages from particular persons, e.g., for communication between employees or for taking orders from customers. In that cases, preferably, various types of outgoing messages may be utilized.

Although, in the embodiments, the transfer device ASAP is disposed at the preceding stage of the second facsimile system FAX-2 as telephone terminal equipment, normally, such device may be omitted.

Figure 6:
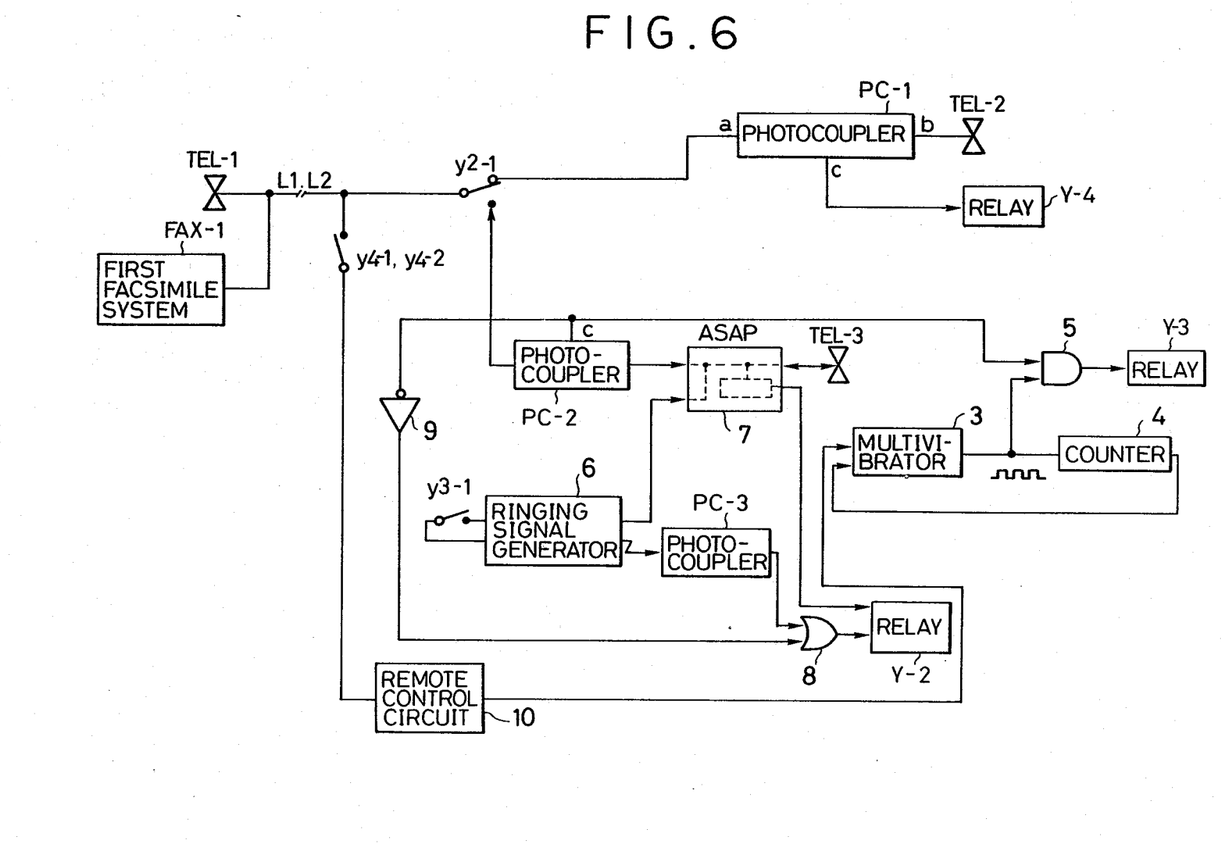
FIG. 6 is a block diagram showing a control system according to a fourth embodiment of the present invention.

FIG. 6 shows a further embodiment of the present control system wherein the system serves as a simple telephone exchanger, the arrangement of FIG. 6 being designed in substantially the same manner as that of FIG. 1. In FIG. 6, a telephone set TEL-2 is connected to the present control system in place of the automatic telephone answering device TAD-1, and another telephone set TEL-3 is connected in stead of the second facsimile system. In this embodiment, modular jacks are employed for respective terminals, switching among terminal equipments is easily performable with single finger motion so as to connect an arbitrary one of them to the control system.

In a first aspect of this embodiment where the control system serves as the simple telephone exchanger, upon reception of an incoming call from the calling party's telephone set TEL-1, the telephone set TEL-2 is actuated to ring through the relay contact y2-1 and the photocoupler PC-1. If the telephone set TEL-2 is off-hooked, the same set TEL-2 ceases to ring and voice circuit is established. At the same time, although a predetermined output is supplied from the output terminal c of the photocoupler PC-1, such output has not to do with the operation of the control system serving as the telephone exchanger.

If it is necessary to cause the telephone set TEL-2 to be off-hooked, a message for instructing an associated person to do so is transmitted from the telephone set TEL-2 to the telephone set TEL-3. If the latter is off-hooked in accordance with the instruction, since a direct electric current component is supplied from the ringing signal generator as mentioned with reference to FIG. 3, a direct electric current component flows through the telephone set TEL-3 upon the same set being off-hooked, so that the light emitting diode LED-1 shown in FIG. 3 is turned on and a H-level output is supplied from the photocoupler PC-3 to turn the relay Y-2 on through the OR gate. As a result, the contact y2-1 of the relay Y-2 is switched in its position to disconnect the telephone set TEL-2 from the telephone lines, while the telephone set TEL-3 is connected to the telephone lines through the photocoupler PC-2 and the transfer device ASAP (which may be omitted), so that voice circuit between the both telephone sides TEL-1 and TEL-3 is established, with the relay Y-2 maintained its ON state by the output from the photocoupler PC-2 during conversation between the both parties. Thereafter, even when the telephone set TEL-3 is on-hooked after completion of conversation by the use of same TEL-3, if the telephone set TEL-2 is in its off-hooked state, another voice circuit is established between the telephone sets TEL-1 and TEL-2 upon restration of the contact y2-1. As will be apparent from the foregoing explanation, arbitrary interruption of the telephone set TEL-3 is permitted to talk to the telephone set TEL-1, TEL-2. That is, the telephone set TEL-3 is assigned a higher priority than the telephone set TEL-2. Further, the telephone sets TEL-2, TEL-3 never form dual loop and then loss in talking level is avoidable and clear conversation is assured. Incidentally, in case of calling up from the side of telephone sets TEL-2, TEL-3, the telephone set TEL-3 is assigned a higher priority as apparent from the above.

Next, a second aspect of this embodiment serving as a simple telephone exchanger will be explained. In the first aspect of the embodiment it is required to install both of the telephone set TEL-2, TEL-3 in the same room. Contrary to this, in the second aspect, these telephone sets TEL-2, TEL-3 may be installed in different rooms, which is selectable by selectively depressing the [#] button of the telephone set TEL-2. Upon reception of an incoming call from the telephone set TEL-1 to the telephone set TEL-2, voice circuit is established if the telephone set TEL-2 is off-hooked, as mentioned above. In this state, if the user at the telephone set TEL-2 side wishes to call up the telephone set TEL-3, he depresses the [#] button of the set TEL-2. The depressed button is detected by the remote control circuit 10 in the same manner as in the case of FIG. 1 where the [#] tone is transmitted from the telephone set TEL-1 side, and hence the output from the circuit 10 is supplied through the multivibrator, the counter 4 and the AND gate 5 to the relay Y-3 to actuate the same relay a predetermined number of times so as to actuate the ringing signal generator 6 with the contact y3-1 of the relay Y-3, so that ringing signals are supplied from the generator 6 to cause the telephone set TEL-3 to intermittently ring several times. If the telephone set TEL-3 is off-hooked by a person who heard the ring, the relay Y-2 is kept in its ON state as mentioned in the first aspect, switching from the telephone set TEL-2 to the other set TEL-3 is performed by the relay contact y2-1 to change the telephone set which is to be connected to the telephone lines, and accordingly voice circuit is established between the telephone sets TEL-1, TEL-3 sides. In the second aspect, the telephone sets TEL-3, TEL-2 may be arranged to be switchable, with the set TEL-3 assigned a higher priority, as in the first aspect of this embodiment.

The control system of the present invention may be employed in the following manner. It is assumed that the second facsimile system is connected instead of the above TEL-3 or in parallel with the TEL-3. In FIG. 1, in case of receiving facsimile data transmitted from the telephone set TEL-1 after reception of an incoming call from the telephone set TEL-1 by the telephone set TEL-2 and completion of desired conversation, the user depresses the [#] button of the telephone set TEL-2. Upon depression of the button, the ringing signals from the ringing signal generator 6 are applied to the second facsimile system to cause the same system to start. Since a predetermined tone is transmitted to the telephone set TE-1 side when the facsimile system is started, an operator at the telephone set TEL-1 side merely depresses the transmission button of the facsimile system FAX-1 just after he has heard such tone. In this manner the present system requires only one dial operation for facsimile data transmission from the side of telephone set TEL-1, as distinct from conventional systems which require twice dial operations therefor.

Although certain preferred embodiments have been shown and described, it should be understood that many changes and modifications may be made therein without departing from the scope of the invention.

What is claimed is:

1. A control system responsive to a telephone ringing signal for selectively connecting and disconnecting an automatic telephone answering device and telephone terminal equipment to and from a public telephone circuit, comprising:
    timer means for generating an output upon elapse of a preset period of time from the instant when operation of said telephone answering device starts;
    control signal reception means responsive to the output from said timer means for generating an output;
    ringing signal generating means responsive to the output from said control signal reception means, for applying to said telephone terminal equipment a dummy ringing signal which is substantially the same as the telephone ringing signal, said dummy signal starting said telephone terminal equipment;
    relay means responsive to operation of said control signal reception means, for disconnecting said automatic telephone answering device from the public telephone circuit and for connecting said telephone terminal equipment to the public telephone circuit; and
    relay control means connected to said relay means and said telephone terminal equipment for causing said relay means to maintain the connection between said telephone terminal equipment and the public telephone circuit after said telephone terminal equipment is operated, and for restoring said relay means upon completion of operation of said telephone terminal equipment, so that connection is established between said telephone answering device and the public telephone circuit.

2. A control system according to claim 1, further including a remote control circuit for determining a particular remote control signal sent through the public telephone circuit from the calling party so as to start said telephone terminal equipment, said remote control signal reception means responding to the output from said remote control circuit.

3. A control system according to claim 2, further including:
    means for disabling said remote control circuit in response to a second particular remote control signal transmitted from the calling party's telephone set,
    wherein said automatic telephone answering device has a remote listening function for reproducing a recorded incoming message and for transmitting the thus reproduced incoming message onto the public telephone circuit, whereby said telephone terminal equipment is prevented from being erroneously started even when the particular remote control signal recorded together with an incoming message is reproduced during the remote listening of the incoming message.

4. A control system according to claim 1, wherein said ringing signal generating means comprises means for generating an alternating current component having a frequency in a range of 16 Hz to 30 Hz, and means for generating a direct current component, said ringing signal generating means superimposing the direct current component on the alternating current component to generate said dummy ringing signal.

5. A control system according to claim 1, further including:
    a timer driving means responsive to engaging operation of said automatic telephone answering device for rendering said timer means operative, said timer driving means causing said timer means inoperative when the telephone set at the side of the called party is on-hook.

6. A control system according to claim 1, wherein said telephone terminal equipment comprises a facsimile system.

7. A control system according to claim 3, wherein said remote control signal is generated upon depression of a corresponding button of a pushphone type telephone set.

8. A control system according to claim 6, wherein said remote control signal is generated from the inside of the facsimile.

9. A control system according to claim 1, further including:
    detecting means for detecting voice supplied from a calling party during the time said telephone answering device is operated in response to the telephone ringing signal; and
    means for starting a facsimile system installed at the side of a called party when no output is supplied from said detecting means.

10. A control system according to claim 1, further including:
    off-hook detecting means for detecting a telephone set installed at the side of said control system being off-hooked; and
    means for connecting a facsimile system to the public telephone circuit in response to an output supplied from said off-hook detecting means.

11. A control system according to claim 4, wherein said remote control signal is generated upon depression of a corresponding button of a pushphone type telephone set.

12. A control system according to claim 4, wherein the terminal equipment includes a facsimile, and said remote control signal is generated from the inside of the facsimile.

* * * * *